Figure 1:
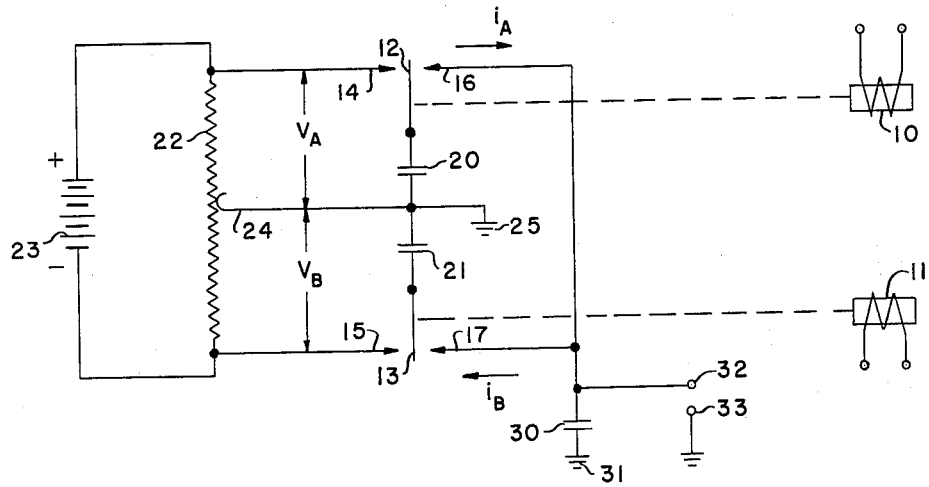

May 14, 1963

HENRICUS H. SCHOTANUS à STERINGA IDZERDA ETAL 3,089,643

CONTROL SYSTEM

Filed Dec. 4, 1958

2 Sheets-Sheet 1

INVENTORS:
HENRICUS H. SCHOTANUS à STERINGA IDZERDA
LUKAS ENSING

BY: *James Todorovic*

THEIR ATTORNEY

May 14, 1963

HENRICUS H. SCHOTANUS à STERINGA IDZERDA ETAL 3,089,643

CONTROL SYSTEM

Filed Dec. 4, 1958

2 Sheets-Sheet 2

INVENTORS:
HENRICUS H. SCHOTANUS à STERINGA IDZERDA
LUKAS ENSING
BY: *James Todorovic*
THEIR ATTORNEY

United States Patent Office 3,089,643
Patented May 14, 1963

3,089,643
CONTROL SYSTEM
Henricus H. Schotanus à Steringa Idzerda and Lukas Ensing, Delft, Netherlands, assignors to Shell Oil Company, a corporation of Delaware
Filed Dec. 4, 1958, Ser. No. 778,113
Claims priority, application Netherlands Dec. 6, 1957
7 Claims. (Cl. 235—151)

This invention relates to a control system and more particularly to a circuit which is adapted to compare two phenomena or characteristics which may have either a periodic or non-periodic character and maintain a predetermined relationship between the phenomena.

In many industrial applications, especially in the control of a process it is necessary to control two phenomena which vary with time and obtain a final result which is a function of the two phenomena. For example, many chemical processes require the mixing of two fluids to supply a mixture of the fluids having a predetermined portion of each of the fluids. When such a mixture is desired, it has customarily been obtained by first measuring the required quantities of the two fluids in separate tanks or storage vessels and then mixing the two fluids, or combining the two fluids in a mixing tank where they can be measured. Also in many other industrial applications, it is necessary to control one characteristic or rate of operation in relation to another characteristic or rate of operation to obtain the desired result or final product.

In the past various mechanical, electrical, and pneumatic devices have been used to control two phenomena which vary with respect to time in order to obtain the desired relationship or ratio between the two phenomena. While these provide satisfactory systems, they have disadvantages, in that none have the required accuracy to permit the mixing of two fluid streams and the delivery of the mixture to a use location. Also required mechanical connections in a mechanical system are relatively difficult to provide in complex installations because of the size of the physical plant and its complexity and may even be impossible in some cases.

Accordingly, it is a principal object of this invention to provide a novel electrical means for comparing two phenomena which vary with respect to time and obtain an electrical control signal for maintaining a predetermined relationship between the two phenomena.

A further object of this invention is to provide a unique circuit which utilizes two auxiliary capacitors connected in series with a reservoir capacitor for comparing the two phenomena which vary with respect to time and obtain a control signal for maintaining a predetermined relationship between the two phenomena.

A further object of this invention is to provide a unique circuit for comparing two phenomena which are frequency dependent to obtain an output signal for maintaining a predetermined relationship between two phenomena.

A still further object of this invention is to provide a unique means for controlling the total flow of two fluid streams in order to provide a mixture of the two fluids having a predetermined portion of each fluid.

A still further object of this invention is to provide a unique means for controlling the total flow of two fluid streams by utilizing means for measuring the flow rate of the streams and converting it to a signal whose frequency is proportional to the flow rate. The frequency signals from each of the measuring means are used to control the charging and discharging of two capacitors disposed in parallel circuits, the two capacitors in turn being connected in series opposition to reservoir capacitor. Thus, the voltage across the reservoir capacitor is a function of the ratio of the total flows of the two streams and may be used to control the flows.

A still further object of this invention is to provide a unique control means for controlling the total fluid from two fluid streams which utilizes two capacitors; the frequency at which the capacitors are charged being proportional to the flow rate in each of the streams with the capacitors in turn being connected in series opposition with a reservoir capacitor. The voltage across the reservoir capacitor is used as the input signal to a current amplifier which is provided with a substantial amount of negative feed back in order that the fluid flow in one of the streams may be controlled by the voltage appearing across the reservoir capacitor while at the same time maintaining in effect substantially zero voltage across the reservoir capacitor.

The above objects and advantages are obtained by the following system which utilizes flow meters to measure the actual flow rates of the fluids which are being mixed. The flow meters measure the flow rates of the fluids and supply an alternating signal having a frequency proportional to the rate of flow of the fluids. The two signals are compared by utilizing each to operate a polarized switching relay which are disposed in the system to alternately charge from a fixed voltage source and then discharge the two auxiliary capacitors in opposition to each other through a reservoir capacitor. The voltage appearing across the reservoir capacitor or a magnitude derived from this voltage is used to control the rate of flow in at least one of the lines by means of a valve or the like. In this way, the proportion of each fluid in the final mixture is accurately controlled. It is preferred to keep the voltage of the reservoir capacitor at a specific value, which is usually the voltage across the capacitor at the commencement of the control to increase the accuracy of the system. In order to accomplish this, it is preferable to use a direct current amplifier having a large amplification factor and a considerable amount of negative feed back so that a voltage of substantially the same magnitude as the voltage across the reservoir capacitor but of opposite polarity is fed back to the discharge circuit of the auxiliary capacitors. In this way a considerable amount of power will be made available for operating the control valve or other equipment while maintaining in effect substantially zero voltage across the reservoir capacitor.

Figure 2:
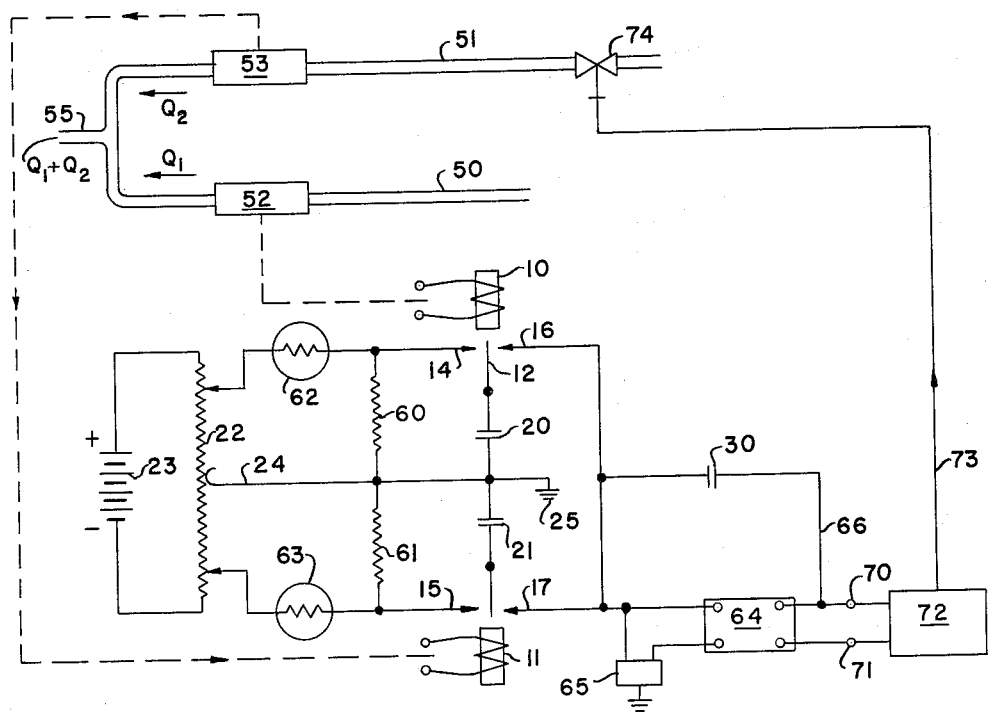
Figure 3:
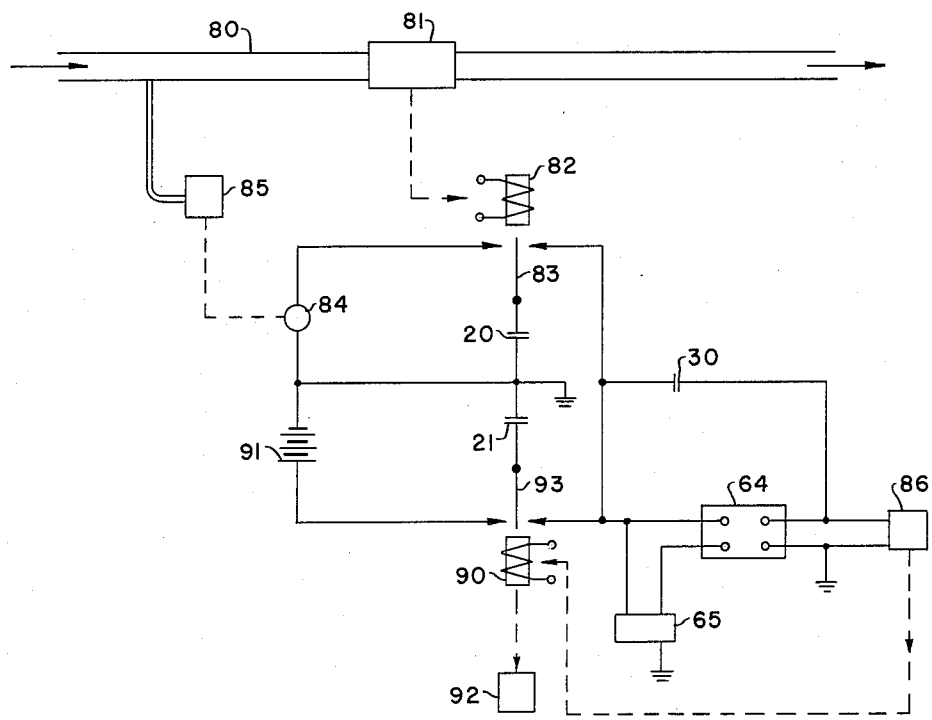

The above and other objects and advantages of this invention will be more readily apparent to those skilled in the art from the following detailed description when taken in conjunction with the attached drawings in which FIGURE 1 is a schematic drawing of a circuit illustrating the principle operation of this invention;

FIGURE 2 is a schematic drawing of an embodiment of this invention as applied to the control of the flow fluids in two lines to maintain a desired ratio between the fluids; and FIGURE 3 is a schematic drawing of a second embodiment.

Referring now to FIGURE 1, there are shown two polarized relay coils 10 and 11 each of which respond individually to one of the two phenomena or characteristics which vary with time. Of course, the phenomena should be converted to an alternating signal whose frequency varies in proportion to the variance in the phenomena. This may be accomplished by any well-known device, depending upon the original form of the phenomena and whether they are periodic or non-periodic. The relay armatures controlled by the coils 10 and 11 are used to position or close the movable switch arms 12 and 13 against contacts 14 or 16 and 15 or 17, respectively. The upper switch arm 12 is connected to one side of an auxiliary capacitor 20 whose other side is connected to a ground 25 while the switch arm 13 is connected to one side of an auxiliary capacitor 21 whose other side is grounded. The fixed contacts 14 and 15 are connected to the opposite ends of a resistance 22 which acts as a voltage divider, with the adjustable contact 24 of the voltage divider 22 being connected to the ground 25. The resistance 22 is energized from any suitable direct current power source which is shown as a battery 23 although other direct current power supplies, such as rectified alternating current, may be used. The fixed contacts 16 and 17 of the relays are connected in series and to one side of a reservoir capacitor 30 whose other side is connected to ground. Two terminals 32 and 33 are provided for utilizing the voltage appearing across the reservoir capacitor 30 to control the two phenomena whose corresponding alternating signals are used to control the relays 10 and 11.

From the above description it can be seen that this invention utilizes two circuits, each having an auxiliary capacitor disposed therein. In addition, a polarized relay is disposed in each circuit for alternatively charging the capacitors from the voltage source and discharging the capacitors in opposition to each other to a reservoir capacitor which is connected in series with both of the parallel circuits. The relays are controlled by an alternating signal which varies in proportion to the phenomena controlled by the circuit. Of course, various means may be used for converting the phenomena into alternating signals whose frequencies vary in proportion to the phenomena. The relays 10 and 11 are thus operated at a frequency which is directly proportional to the two phenomena and, accordingly, the auxiliary capacitors 20 and 21 are charged at a rate which is directly proportional to the two phenomena. The charge per unit of time obtained by each of the auxiliary capacitors will be an analog of the respective phenomena. The two auxiliary capacitors are connected to the reservoir capacitor 30 in opposition so that the charge contributed to the reservoir capacitor 30 by the capacitor 20 may be entirely removed or partially removed by the capacitor 21. Thus, the capacitor 30 will integrate the difference in the current signals from the two auxiliary capacitors so that the net voltage appearing across the reservoir capacitor 30 represents the difference between the actual relationship of the two phenomena and their desired relationship. When the two phenomena represent the flow rates into two conduits, this means that the final voltage across the reservoir capacitor 30 will be a function of the difference between the actual ratio of the total flows in the two conduits and the desired ratio of total flows.

This can be seen from the following when the relays close the switch contacts 12 and 13 against the fixed contacts 14 and 15 the capacitor 20 is charged to the voltage $V_A$ while the capacitor 21 is charged to the voltage $V_B$. When the relays close the switch contacts in the opposite positions, the capacitors 20 and 21 discharge to the reservoir capacitor 30 with the capacitor 20 supplying a direct current $I_A$ and the capacitor 21 supplying a current $I_B$. The currents $I_A$ and $I_B$ averaged over time may be represented by the following formulae:

$$I_A = F_A C_{20} V_A \quad (1)$$
$$I_B = F_B C_{21} V_B \quad (2)$$

in which $F_A$ and $F_B$ are the frequency of the current used for actuating the relays 10 and 11 and $C_{20}$ and $C_{21}$ represent the capacitance of the capacitors 20 and 21. The voltage across the reservoir capacitor 30 may be represented by the following formula:

$$\epsilon = \frac{1}{C_V} \int (I_A - I_B) dt = \frac{1}{C_V} \int (F_A \cdot C_{20} \cdot V_A - F_B \cdot C_{21} \cdot V_B) dt \quad (3)$$

From this relationship it is seen that the voltage across the reservoir capacitor 30 is a function of the integral of the difference in the frequencies $F_A$ and $F_B$. If it is assumed that the frequencies $F_A$ and $F_B$ have a ratio equal to $p$, then the terms $C_{20}$, $V_A$, $C_{21}$, and $V_B$ may be given values to yield the following formula:

$$\frac{C_{20} V_A}{C_{21} V_B} = \frac{1}{p} \quad (4)$$

This means that $I_A$ will equal $I_B$ if the ratio $F_A/F_B$ has in fact the value $p$ so that the voltage $\epsilon$ will have a constant value which is equal to the initial voltage on the capacitor 30. From an inspection of Equation 4, it will be seen that the value of the ratio $p$ can be adjusted by changing the ratio of $V_A/V_B$ or the ratio of $C_{20}/C_{21}$ or both of these ratios. The value of $V_A/V_B$ of course is easily changed by repositioning the slider 24 of the voltage divider 22 while variable capacitors may be used for $C_{20}$ and $C_{21}$. If the ratio $F_A/F_B$ does not have the value $p$ the voltage $\epsilon$ will be the time integral of the difference between the actual ratio of $F_A/F_B$ and the value $p$.

In order to achieve the above results in an actual case, it would be necessary to utilize capacitors having a relatively small capacitance for the auxiliary capacitors 20 and 21 and a relatively large direct current voltage supply 23 in conjunction with a low resistance circuit in order that the auxiliary capacitors will be substantially fully charged during the closing of the relay contacts 14 and 15 and substantially completely discharged through the reservoir capacitor 30. In order to further insure that the two auxiliary capacitors substantially completely discharge, the voltage across the capacitor 30 should be maintained relatively small and the capacitor 30 should have a relatively large value when compared to the capacitors 20 and 21 and a relatively large time constant on the order of one to five hours. It is preferred to maintain the voltage across the capacitor 30 zero or nearly so in order to insure that the capacitors 20 and 21 substantially completely discharge during the closing of the contacts 16 and 17.

Referring now to FIGURE 2, the above-described circuit is shown incorporated in a system for controlling the mixing of the fluid streams $Q_1$ and $Q_2$ flowing in the lines 50 and 51, respectively. In this figure components which are the same as those described with respect to FIGURE 1 have the same number and will not be described further. The lines 50 and 51 are shown as joined to form a common conduit 55 in which the fluid streams $Q_1$ and $Q_2$ are mixed and delivered to an end use location. The rate of flow of the fluid $Q_1$ is measured by a meter means 52 which supplies an alternating output signal to the relay 10 with the frequency varying proportional with the rate of flow of the fluid $Q_1$. The meter 52 may be of any well-known type, such as either a positive displacement or turbine-type meter which supplies an alternating output signal having a frequency which varies over the range of 1 to 10 cycles per second, for example. The rate of flow of the fluid $Q_2$ in the line 51 is similarly metered by a meter means 53. A resistance 62 is connected in series with the auxiliary capacitor 20 and is responsive to the temperature of the fluid $Q_1$ flowing in the line 50 and used to correct the system for temperature changes of the fluid in line 50. This resistance may be a resistance thermometer or a resistance which is responsive to the signal from thermocouple. A similar resistance 63 is connected in series with the capacitor 21. Two shunt resistors 60 and 61 are connected in parallel with the voltage divider 22 and in series with the resistances 62 and 63, respectively. The combination of resistances 60, 62 and 61, 63 thus form voltage dividing networks which are responsive to the temperatures of the fluid streams $Q_1$ and $Q_2$. Also in some cases, it may be necessary to place an additional resistance in series with each of the capacitors 20 and 21 in order to limit the initial charging current flowing in the circuit to a reasonable value.

The voltage appearing across the reservoir capacitor 30 is used either directly or indirectly to control one or both of the phenomena to maintain the desired relationship between the two phenomena. While it is desirable to use the voltage across capacitor 30 or a quantity derived from this voltage to control the phenomena, this voltage must be maintained preferably at a zero value in order that the auxiliary capacitors 20 and 21 may completely or at least substantially discharge into the reservoir capacitor. In order to accomplish both of these purposes it is preferred to use a current amplifier which generates a signal substantially equal but of opposite polarity to the voltage appearing across the reservoir capacitor. This signal is then fed back into the discharge circuit of the auxiliary capacitors. Thus in effect the voltage across the reservoir capacitor has substantially a zero value, while at the same time the output of the amplifier may be used to control the phenomena.

Many systems are available for accomplishing the above results, as for example by the use of a cathode-follower type of amplifier. This type of amplifier has substantially a unity amplification factor and a large amount of negative feedback. Thus, it will effectively compensate for the voltage across the reservoir capacitor by supplying a voltage of substantially the same magnitude but opposite polarity to its impact side. While one may use a cathode-follower type of amplifier it is preferable to use a direct current amplifier having a large amplification factor and include the reservoir capacitor 30 in its feedback loop as described below. In this circuit the amplifier itself acts as a reservoir capacitor of large capacity.

The voltage appearing across the reservoir capacitor 30 is used as the input signal to a direct current amplifier 64 which has a drift correcting means 65 disposed across its input terminals. The amplifier 64 may be any well-know type of current amplifier which has a large amplification factor and can be provided with a substantial amount of feedback through the reservoir capacitor. The negative feedback is supplied by means of a lead 66 from one of the output terminals of the amplifier 64 through the reservoir capacitor 30 to the input terminals of the amplifier. The drift corrector 65 is utilized to correct the drift of the amplifier, as the drift will impair the accuracy of the control. The output terminal 70 and 71 of the amplifier 64 are connected to a controller 72 which utilizes the signal from the amplifier to supply a control signal by means of the connection 73 to the control valve 74. The control valve 74 is disposed in the line 51 to control the flow rate of the fluid $Q_2$. By controlling the flow rate of the fluid $Q_2$ the total quantity of the fluid $Q_2$ in the final mixture of $Q_1$ and $Q_2$ can be controlled to supply any desired ratio between $Q_1$ and $Q_2$.

From the above description it can be seen that the circuit shown in FIGURE 2 supplies a simple means for accurately controlling the ratio between the total quantities of $Q_1$ and $Q_2$ supplied to the line 55. The use of an amplifier 64 to supply a voltage which is substantially equal but opposite to the voltage appearing across the capacitor 30 provides a control signal having substantial power to operate the controller 72 while maintaining the voltage across the capacitor 30 at substantially zero value. While it is possible to use the voltage across the capacitor 30, to directly control the controller 72 such a system is inaccurate since the voltage across the capacitor 30 is no longer a true integration of the difference between the currents $I_A$ and $I_B$.

The above system has been described in relation to the mixing of two fluid streams $Q_1$ and $Q_2$ but it will be readily apparent to those skilled in the art that the system can be extended to control the mixing of any number of fluid steams by combining the steams two at a time. For example, the fluid stream $Q_1+Q_2$ could be combined with a third fluid stream $Q_3$ to give a final mixture of $Q_1+Q_2+Q_3$ in which each fluid forms a predetermined amount of the final mixture. In this case, the ratio between $Q_1$ and $Q_2$ would be controlled by one system and the ratio between the mixture $Q_1+Q_2$ and $Q_3$ by a second system. It should be noted that while flow rates of the fluid streams are measured the system integates the differences between the actual flow rates and the desired flow rates to obtain the desired ratio of actual total flow in the two streams. This results in an accurate control of the quantity of each fluid in the final mixture and permits the delivery of the mixture directly to an end use location.

Referring now to FIGURE 3, there is shown a modification of the circuit shown in FIGURE 2 which permits one to measure the total mass of material flowing in a line 80 over a finite time. In this circuit a meter 81 is mounted in the line 80 and supplies an alternating signal whose frequency is proportional to the flow rate of the material in line 80. The meter 81 should be similar to the meters 52 and 53 shown in FIGURE 2. The alternating signal from the meter 81 is used to actuate a polarized relay 82 in order that the movable switch arm 83 of the relay will alternately connect the capacitor 20 to a charging circuit including a source 84 of direct current and to a discharge circuit including the reservoir capacitor 30. The source 84 is supplied by a measuring device 85 which is capable of measuring the density of the material flowing in the line 80 and supplying a direct current signal which is proportional thereto. The direct current amplifier 64 is disposed in parallel with the reservoir capacitor 30 and is adapted to supply an output signal substantially equal to but of opposite polarity to the voltage appearing across the capacitor 30. The direct current amplifier is also supplied with a drift connecting means 65 such as that described above with reference to FIGURE 2. The output of the amplifier 64 is used to control the frequency of a multivibrator or oscillator 86 with the output of the multivibrator being coupled to a polarized relay 90. The switch arm 93 of the polarized relay 90 is disposed to alternately couple the capacitor 21 to a charging circuit including a source 91 of a fixed potential direct current and to discharge circuit including the reservoir capacitor 30. A counting means 92 is disposed to be actuated by the relay 90 in order to sum up the total impulses from the multivibrator 86. The sum of all these impulses are proportional to the total mass of material which is passed through the line 80 over a finite period of time.

When the above system is operated the meter 81 will supply a signal having a frequency $F_1$ while the meter 85 will supply a direct current signal having the magnitude $E_1$ thus if one assumes that the source 91 has a potential $E_2$ and that the voltage across the reservoir capacitor 30 is substantially constant the following relationship will apply in which $F_2$ is equal to the frequency of the multivibrator 86, $$E_1 \times C_{20} \times F_1 = E_2 C_{21} F_2$$

If the capacity of the capacitors $C_{20}$ and $C_{21}$ are equal this relationship may then be written as follows:

$$\rho \times f = K \times f_2$$

in which K is a constant, $\rho$ is the density of the material and $f$ is the rate of flow of the material. From this relationship it can be seen that the frequency $f_2$ is a measure of the mass flow through the line 80 per unit of time. Thus if the frequency $f_2$ is integrated with respect to time the result will be the mass flow over finite period of time. This integration is formed by the counting mechanism 92 in FIGURE 3. It should be noted that the capacitor 21 is charged and discharged at the rate required to keep the voltage across the reservoir capacitor 30 constant or nearly so.

By slightly modifying the circuit shown in FIGURE 3 it can be converted to supply a control voltage which is a measure of the momentary value of the mass flow through the line 80 for controlling a process of the like. In order to do this it is necessary to drive the relay 90 at a fixed frequency which may be derived from any source such as a 60-cycle supply line. Also the multivibrator 86 is replaced by an amplifier preferably an amplifier which includes an integrating circuit. The output of this amplifier is then used as the constant voltage source 91 as well as to supply an electrical signal for controlling the process. This circuit would then insure that the voltage across the reservoir capacitor 30 is maintained substantially constant preferably at a zero value and that the signal from the integrating amplifier is proportional to the momentary value of the mass flow.

In addition to controlling the ratio of two fluid streams the system can also control or determine the ratio between any two phenomena which can be represented by an alternating current. Accordingly, this invention should not be limited to the particular details described and illustrated but only to its broad spirit and scope.

We claim as our invention:

1. In a system for controlling the ratio of a first fluid stream mixed with a second fluid stream in which meter means disposed in said first and second fluid streams generate first and second electrical signals whose frequency is proportional to the flow rate of said first and second streams respectively the combination with said meter means comprising: first and second circuit means, each of said first and second circuit means including a source of direct current potential and a capacitor; a switching means disposed in each of said first and second circuits to alternately connect the capacitors in said first and second circuits to said potential sources and to a capacitor disposed in a third circuit to discharge the capacitors in said first and second circuits to the capacitor in the third circuit in opposition to each other; the switching means disposed in said first and second circuits being controlled by said first and second signals to charge the capacitor in said third circuit as a function of the difference between total flow of each of said streams and control means responsive to the voltage across the capacitor in said third circuit for controlling the flow in one of said fluid streams.

2. In a circuit for comparing a plurality of phenomena which vary with respect to time and are represented by separate alternating signals whose frequencies are proportional to the respective phenomena the combination with said phenomena comprising: means for coupling each alternating signal to a separate polarized relay to energize said separate polarized relays; each separate polarized relay being disposed to alternately couple an auxiliary capacitor to a charging circuit and a discharge circuit; said auxiliary capacitors being disposed in pairs connected in series opposition; said pairs of capacitors being coupled to discharge through a reservoir capacitor, the voltage across said reservoir capacitor being a function of the difference between the phenomena whose associated relays are coupled to said pair of auxiliary capacitors.

3. In a circuit for comparing two phenomena which are represented by separate alternating signals whose frequencies vary in proportion to respective phenomena; the combination with said phenomena comprising: means for converting each of the phenomena into separate alternating signals, each alternating signal being coupled to a polarized relay, said polarized relays being disposed to connect one of a pair of auxiliary capacitors connected in opposition to each other to a charging circuit and to a discharge circuit, said discharge circuit including a reservoir capacitor the net charge on said reservoir capacitor being equal to the difference in the charges of said auxiliary capacitors.

4. A system for controlling the ratio between the quantities of fluids supplied by two fluid flow lines in which the rate of flow in each line is represented by first and second alternating electrical signals, the frequency of said first and second alternating signals being proportional to the rate of flow in the two fluid streams, respectively the combination with said alternating signal comprising: first and second relay means responsive to said first and second alternating signals for alternately connecting first and second auxiliary condensers to charging circuits and to a reservoir capacitor, said first and second capacitors discharging to said reservoir capacitor in opposition; circuit means for generating a voltage substantially equal but of opposite polarity to the voltage appearing across said reservoir capacitor; supplying said voltage to the discharge circuit of said first and second capacitors and control means responsive to the voltage generated by said circuit means to control the rate of flow in at least one of the fluid flow lines.

5. A system for controlling the ratio between the quantities of fluids supplied by two fluid flow lines in which the rate of flow in each line is represented by first and second alternating electrical signals, the frequency of said first and second alternating signals being proportional to the rate of flow in the two fluid streams, respectively the combination with said alternating signal comprising: first and second relay means responsive to said first and second alternating signals for alternately connecting first and second auxiliary condensers to charging circuits and to a reservoir capacitor, said first and second capacitors discharging to said reservoir capacitor in opposition; a direct current amplifier having negative feedback for generating an output signal having substantially the same magnitude but of opposite polarity to the voltage across said reservoir capacitor, supplying said output signal to the discharge circuit of said auxiliary capacitors, and the output signal of said direct current amplifier being used to control the rate of flow in at least one of the fluid flow lines.

6. A system for obtaining the time integral of the product of two phenomena comprising: a first circuit means including a source of direct current potential for obtaining a unidirectional voltage which is a measure of one of the phenomena; a second circuit means responsive to the other of the phenomena for controlling the potential of the direct current source in said first circuit means; the unidirectional current of said first circuit means being coupled to charge a reservoir capacitor; a third circuit means disposed to generate an electrical signal which is a function of the charge on the reservoir capacitor; a control means responsive to said electrical signal for substantially returning said reservoir capacitor to its initial condition of charge, and means for integrating said electrical signal with respect to time to obtain a final signal proportional to the time integral of the product of the two phenomena.

7. A system for controlling the mixing of two fluid streams comprising: means disposed in each fluid stream for generating first and second electrical signals proportional to the flow rate in each stream; two circuits each including a source of direct current, a switch means and a capacitor, said switch means being responsive to the first and second electrical signals to charge said capacitors; a third circuit including a capacitor, said switch means in addition being responsive to said first and second electrical signals to discharge the capacitors of said two circuits in opposition to each other through the capacitor of said third circuit, the voltage across the capacitor in said third circuit being a function of the difference between the flows in said two fluid streams.

References Cited in the file of this patent

UNITED STATES PATENTS

| 2,394,297 | Fayles | Feb. 5, 1946 |
| 2,419,607 | Terry | Apr. 29, 1947 |
| 2,503,213 | Philbrick | Apr. 4, 1950 |
| 2,870,408 | Dragonjac | Jan. 20, 1959 |
| 2,874,906 | Nossen | Feb. 24, 1959 |
| 2,919,578 | Sink | Jan. 5, 1960 |

OTHER REFERENCES

"Waveforms," Chance et al., 1949, McGraw-Hill Book Co., Inc., page 54 relied on.